US006658479B1

(12) United States Patent
Zaumen et al.

(10) Patent No.: US 6,658,479 B1
(45) Date of Patent: Dec. 2, 2003

(54) LOAD-BALANCED ANYCASTING AND ROUTING IN A NETWORK

(75) Inventors: William T. Zaumen, Palo Alto, CA (US); Jose J. Garcia-Luna-Aceves, San Mateo, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 587 days.

(21) Appl. No.: 09/607,639

(22) Filed: Jun. 30, 2000

(51) Int. Cl.[7] ............................. G06F 13/00; H04Q 7/20
(52) U.S. Cl. ....................... 709/238; 709/224; 709/241; 370/254
(58) Field of Search .................................. 709/200, 201, 709/220, 223, 224, 235, 238, 239, 240, 241, 242; 370/253, 254, 255, 256

(56) References Cited

U.S. PATENT DOCUMENTS

| | | | | | |
|---|---|---|---|---|---|
| 5,649,108 | A | * | 7/1997 | Spiegel et al. | 709/212 |
| 5,754,543 | A | * | 5/1998 | Seid | 370/351 |
| 5,856,981 | A | * | 1/1999 | Voelker | 371/20.1 |
| 5,881,243 | A | | 3/1999 | Zaumen et al. | 709/200 |
| 6,256,295 | B1 | * | 7/2001 | Callon | 370/254 |
| 6,456,599 | B1 | * | 9/2002 | Elliott | 370/254 |
| 6,584,075 | B1 | * | 6/2003 | Gupta et al. | 370/256 |

FOREIGN PATENT DOCUMENTS

| EP | 858189 A2 | 8/1998 |
|---|---|---|
| WO | PCT/US01/21175 | 2/2001 |

OTHER PUBLICATIONS

Zaumen et al., "A Practical Approach to Minimizing Delays in Internet Routing", 5 pages, www.soe.ucsc.edu/research/ccrg.

Garcia–Luna–Aceves et al., "A Simple Approximation to Minimum–Delay Routing", 12 pages, www.soe.ucsc.edu/research/ccrg.

Vitukury, S. et al.: "A Simple Approximation to Minimum–Delay Routing" Computer Communications Review Association For Computing Machinery. New York, US, vol. 29, No. 4, Oct. 1999, pp. 227–238, XP000852201, ISSN: 0146–4833.

Cassandras, C G et al.: "Distributed Routing With On–Line Marginal Delay Estimation", Networks: Evolution or Revolution? New Orleans, Mar. 27–31, 1988, Proceedings fo the Annual Joint Conference of the Computer and Communications Societies. (INFOCOM), NewYork, IEEE, US, vol. CONF.7, Mar. 27, 1988, pp. 603–612, XP010011723, ISBN: 0–8186–0833–1.

Zaumen et al.: "Load–Balanced Anycast Routing in Computer Network", Fifth IEEE Symposium on Computers and Communications (ISCC 2000), Jul. 3–6, 2000, pp. 566–574, XP002189124, Anitbes–Juan les Pins, France, ISBN: 0–7695–0722–0.

* cited by examiner

Primary Examiner—Moustafa M. Meky
(74) Attorney, Agent, or Firm—Blakely, Sokoloff, Taylor & Zafman (57) ABSTRACT

A method for determining the cost of routing data is described herein, where a communication cost for routing data from a current node to a successor node over a communication channel is computed, and then a processing node cost for processing data at the current node is computed, where the processing node cost represents a ratio of data input rates to data output rates at the current node. The two computations are combined to formulate a link cost for the current node, or the cost of routing data through that node. The link cost can then be used in a routing algorithm for routing data.

14 Claims, 4 Drawing Sheets

LOAD-BALANCED ANYCASTING AND ROUTING IN A NETWORK

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

This invention pertains to the field of networking, and more particularly to Internet routing protocols.

BACKGROUND OF THE INVENTION

Congestion at the links and in the routers is the main cause of large delays in the Internet. The approaches proposed to date for minimizing congestion fall in two categories: minimizing link delays in the network and server load balancing.

The conventional approach to minimizing link delays in computer networks consists of using a heuristic to compute a single shortest path from a source to a destination. Routing algorithms based on single shortest-path heuristics are very responsive to topological and link-cost changes, making them far more preferable than optimal routing for implementation in real networks. However, except under light traffic loads, the delays obtained with this type of routing are far from optimal. Furthermore, if link costs are associated with delays, single-path routing exhibits oscillatory behavior and becomes unstable as traffic loads increase.

Many optimal routing algorithms for minimizing link delays exist (also known as minimum-delay routing algorithms), but they all assume the input traffic and the network topology are stationary or very slowly changing, and require global constants that guarantee convergence. This makes optimal routing algorithms impractical for real networks given the bursty nature of traffic at any time scale, the random occurrences of topology changes, and the impossibility of determining global time constants that work for all input-traffic patterns.

With server load-balancing, a computation is assigned to a server based on the current computational load on various other servers, possibly with provisions for failover to handle the loss of a server or communication link. Commercial products typically use round robin, least number of connections, weighted priority, and server load or response time to determine how to distribute traffic among servers, but treat server load and network load separately.

With the widespread use of Internet technology and the affordability of computing hardware today, it is desirable to distribute processing elements (servers) over a network or internet to perform a wide variety of computing services. By doing so, third parties can maintain the servers and the network accessed by users, such that users do not have to worry about system management and need not know where in the network the services are provided.

Since congestion at the links and in the routers is the main cause of large delays, a routing method is more effectively optimized when congestion at both links and at routers is considered. No approaches to date, however, have been presented for the joint minimization of congestion at the links and servers of a network.

SUMMARY OF THE INVENTION

A method for determining the cost of routing data is described herein, where a communication cost for routing data from a current node to a successor node over a communication channel is computed, and then a processing node cost for processing data at the current node is computed, where the processing node cost represents a ratio of data input rates to data output rates at the current node. The two computations are combined to formulate a link cost for the current node, or the cost of routing data through that node, where the link cost can then be used in a routing algorithm for routing data.

BRIEF DESCRIPTION OF FIGURES

The present invention is illustrated by way of example, and not by way of limitation, in the figures of the accompanying drawings and in which like reference numerals refer to similar elements and in which.

DETAILED DESCRIPTION OF THE INVENTION

A need exists for an apparatus and method that minimizes both link delays and processing delays at network nodes.

An apparatus and a method for load-balanced anycasting and routing for minimizing congestion in a computer network is described herein. Services are routed to nodes in a way that simultaneously minimizes congestion in the network and balances the load in the servers. When a service is requested, where a service comprises a source node, a destination node, and at least one node for processing a step in the requested service, a link cost is determined for each link connecting two nodes for every possible route to the destination node. A link cost at a current node is the cost of routing a data flow from a current node to a successor node. Where the node is also a server for processing data (as opposed to a router for just routing data), a processing cost for processing data at that node is also taken into account. In preferred embodiments of the invention, the cost metric used to measure the link cost is the marginal delay on the link or the node, or the rate of change of delay with respect to flow through the link or the node.

Load-balanced anycasting and routing is premised on allowing user requests to refer to services in a network, rather than the servers where the services are provided, and that a given service is available at multiple servers. A service can be distributed across multiple servers, with subsets of the nodes in the network providing a particular processing step for the service. Each service may comprise one or more routes, and the sequence of processing steps for every route for that service is fixed and known in advance.

Throughout this description, a node refers to a general computing device within a network. A node can be a server for performing a processing step of a service, or a general purpose server for performing many different computations. A node may also be a router for routing traffic. Furthermore, with respect to a current node, any node which can route data to the current node is a predecessor node, and a node which is closer in terms of cost to the destination node than the current node is a successor node. A successor node is closer in terms of cost to a destination node than a current node if the successor node can route data to the destination node faster than another node, overall more efficiently than another node (taking into account the entire network), or if the successor node is closer in proximity to the destination node, for example. The set of all successor nodes with respect to a current node is referred to as the successor set.

The present invention includes various steps, which will be described below. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Introduction

Figure 1:
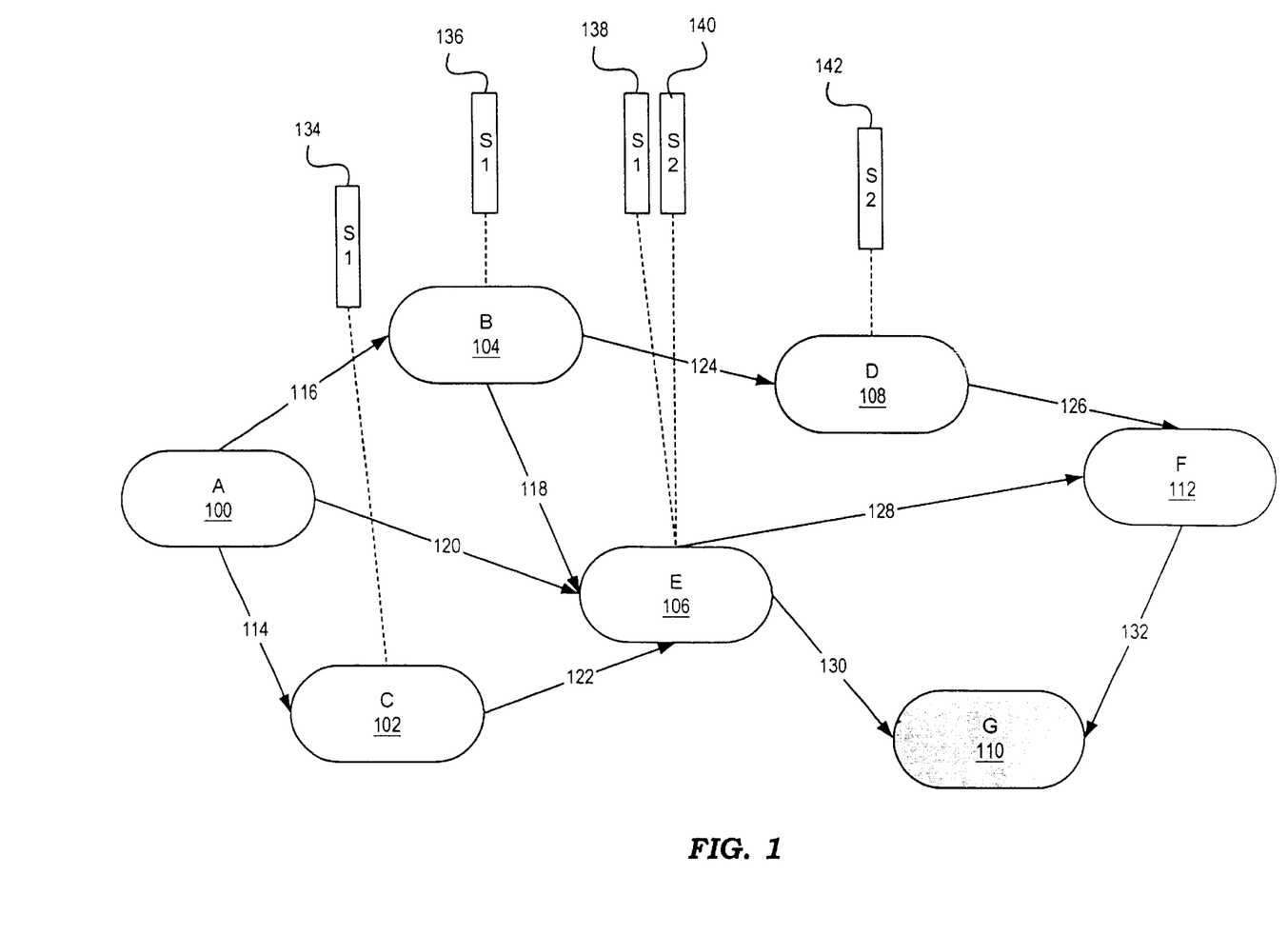
FIG. 1 is an illustrative network for routing data.

As illustrated in FIG. 1, a network comprises nodes 100, 102, 104, 106, 108, 110, 112 (hereinafter referred to as nodes A, B, C, D, E, F, and G in accordance with FIG. 1), where each node may be a router node 100, 112 for routing traffic, and may, optionally, be a server node 102, 104, 106, 108, 110 for performing one or more processing steps 134, 136, 138, 140, 142 associated with a given service. For example, a service can be an encryption service that requires a number of steps between a source and a destination. A request for an encryption service may be routed to a server for encrypting (or decrypting) data; a server for transferring the data to a destination using an appropriate protocol (such as HTTP or FTP); and a number of routers for routing the data.

For example, a request originates at node A for a service which ends at node G, and which requires processing steps S1 and S2. In this example, S1 can be processed at nodes B, C, or E; and S2 can be processed at nodes E or D. Furthermore, nodes B, C, and D are each specialized devices for performing a specific computation; nodes E and G are both general-purpose computers capable of performing many different computations associated with a service; and nodes A and F are routers. Each node may additionally be a router.

As illustrated by the links 114, 116, 118, 120, 122, 124, 126, 128, 130, 132, there are a number of routes that can be taken to get from source node A to destination node G, where all of these routes are predetermined (i.e., node A is programmed to route data to node B, E, or C). However, depending on congestion in the network and traffic at the nodes, some routes are optimal in that they are both efficient and alleviate traffic on the network.

Routing Costs

When a service is requested, a destination node for the requested service is determined. In reference to FIG. 1, data flowing from source node A to destination node G requires processing steps S1 and S2. In this example, there are seven possible routes that can be taken to arrive at destination node G, as follows: ABDFG, ABEFG, ABEG, AEG, AEFG, ACEG, and ACEFG. The path that is traversed for any given flow of data from node A to node G depends upon traffic conditions on the links 114, 116, 118, 120, 122, 124, 126, 128, 130, 132 and on the nodes 100, 102, 104, 106, 108, 110, 112. In preferred embodiments, the cost metric that is used to measure traffic conditions is marginal delay. Where a delay is the time it takes a flow of data to enter a system and the corresponding output to be generated, the marginal delay is the rate of change of delay with respect to the flow.

In addition, in preferred embodiments, possible routes between processing nodes is determined by any routing algorithm that provides multiple loop-free paths, including, but not limited to, the shortest path, using marginal delay as a cost metric. The best known algorithm for this purpose is DASM (U.S. Pat. No. 5,881,243).

Throughout the description, the link cost refers to the total cost of routing data through a given link, taking into account factors that may affect the total cost. Preferably, these factors include the communication cost and the processing node cost. The communication cost refers to the delay in routing data from one node to another node over a communication channel. The communication cost comprises both a constant propagation delay and a queuing delay in waiting to use the channel. Consider a highway with metering lights that keep traffic at a level where one can drive at full speed. The propagation delay would correspond to the time it takes to drive along the road, and the queuing delay is the time spent at the metering light. As more cars arrive, the wait at the light gets worse.

In preferred embodiments, the cost metric used in measuring the link cost is the marginal delay of routing data from one node i to a successor node j, which considers factors affecting traffic. Factors affecting traffic, in preferred embodiments, include the communication cost and the processing node cost, where the communication cost is the marginal delay of routing data on a communication channel between node i and node j, and the processing node cost is the marginal delay of processing data at node i. The delay associated with a communication channel depends on the type of communication channel that is used. For instance, Ethernet behaves differently from FDDI (Fiber Distributed Data Interface).

The marginal delay for a link (i.e., communication channel) is the rate of change of delay with respect to the flow through the link, where the delay is the time it takes for a packet to enter the link and the corresponding output to be generated, multiplied by the number of packets or bytes per second going through the system. The marginal delay for a node at which processing occurs is the rate of change with respect to the flow through the node for a given service, where the delay is the time it takes for a packet to enter the system and the corresponding output to be generated, multiplied by the number of packets or bytes per second going through the system.

In both cases, the marginal delay may be determined by measurement, or, in some cases, analytically. For example, if the network is such that one knows the delay as a function of flow, the marginal delay can be analytically measured by computing the derivative of the delay using standard techniques, such as described in any text on differential calculus. When done by measurement, one can measure the delay at various flow levels. For example, if D1 is the delay for flow level f1, D2 is the delay for flow level f2, and if f1–f2 is close to zero, then the marginal delay can be computed as (D1–D2)/(f1–f2).

While marginal delay is the cost metric used in a preferred embodiment, it should be understood by one skilled in the art that other cost metrics can be used to measure the cost of routing data. For example, cost could alternatively be measured by an equation such as the derivative of d+0.000001× d² (where d is the delay). Other cost metrics include the number of hops to a destination and financial costs, for example.

Communication Costs

For a given link connecting two nodes (link 116 connecting nodes A and B; link 120 connecting nodes A and E; link 114 connecting nodes A and C; link 124 connecting nodes B and D; link 118 connecting nodes 8 and E; link 126 connecting nodes D and F; link 122 connecting nodes C and E; link 128 connecting nodes E and F; link 130 connecting nodes E and G; link 132 connecting nodes F and G), there is a communication cost associated with routing a data flow through that link. The communication cost associated with routing data through each link in a given route ABDFG (assuming that this route is the optimal route determined under an algorithm of the present invention) can be represented as follows:

$$D_{AB}=D_{BD}+I_{AB}$$

$$D_{BD}=D_{DF}+I_{BD}$$

$$D_{DF}=D_{FG}+I_{DF}$$

$$D_{FG}=D_{GG}+I_{FG}$$

where $D_{ij}$ represents the link cost (i.e., in preferred embodiments, the rate of change of routing data from node i to node j if additional traffic is added, which may include other factors in addition to link cost) from node i to node j, and $I_{ij}$ represents the communication cost from node i to node j.

Thus, the communication cost from node A to node B is the sum of the link cost from node B to node D plus the communication cost on the link between node A and node B; the communication cost from node B to node D is the sum of the communication cost from node D to node F plus the link cost between node B and node D; the communication cost from node D to node F is the sum of the communication cost from node F to node G plus the link cost between node D and node F; the communication cost from node F to node G is the sum of the communication cost from node G to node G plus the link cost between node F and node G. Since there is no link cost associated with a destination node (i.e., the cost from the destination node to the destination node is 0), the cost of routing data at node G, $D_{GG}=0$. Since the cost of routing data at the destination node G is known, the cost of routing data from each node preceding G can be determined using backwards propagation. Substituting for equations:

$$D_{GG}=0;$$

$$D_{FG}=D_{GG}+I_{FG}=0+I_{FG}=I_{FG};$$

$$D_{DF}=D_{FG}+I_{DF}=I_{FG}+I_{DF};$$

$$D_{BD}=D_{DF}+I_{BD}=I_{FG}+I_{DF}+I_{BD};$$

$$D_{AB}=D_{BD}+I_{AB}=I_{FG}+I_{DF}+I_{BD}+I_{AB}$$

Thus, the communication cost of routing data from source node A to destination node G is the summation of: the communication cost from node F to node G; the communication cost from node D to node F; the communication cost from node B to node D; and the communication cost from node A to node B. Where the link cost at a current node to a successor node is a function of communication cost only, as in the above equations, the link cost between a source node A and a destination node G is equal to the summation of communication costs for all intermediate nodes in the path.

Since the communication cost of routing data through each link is expressed in terms of routing data through successor links, each communication cost $D_{AB}$, $D_{BD}$, $D_{DF}$, and $D_{FG}$ can alternatively be expressed as $D_{AG}$, $D_{BG}$, $D_{DG}$, and $D_{FG}$, respectively. Moreover, while $D_{AB}$, $D_{BD}$, $D_{DF}$, and $D_{FG}$ each represents a cost associated with a link in a specific route from source node A to destination node G, $D_{AG}$, $D_{BG}$, $D_{DG}$, and $D_{GG}$ each represents a cost associated with a link in an undetermined route from source node A to destination node G, where each communication cost is associated with a link from a current node to a successor node, and the successor node is closer to the destination node G than the current node. In other words, $D_{AG}$ can be represented as $D_{AG}$, $D_{AE}$, or $D_{AC}$, depending on the minimum delay anycasting algorithm computed for a given network topology and traffic conditions in accordance with this invention.

As will be discussed, a successor node in a given path (i.e., whether A to B, A to E, or A to C is selected) is dynamically determined using a minimum delay anycasting routing algorithm in accordance with the present invention. The cost of routing data from source node A to destination node G, where, for example, ABDFG, is the optimal route from A to G, can then be expressed as the following series of equations:

$$D_{AG}=D_{BG}+I_{AB}$$

$$D_{BG}=D_{DG}+I_{BD}$$

$$D_{DG}=D_{FG}+I_{DF}$$

$$D_{FG}=D_{GG}+I_{FG}$$

and the cost from source node A to destination node G in path ABDFG can be expressed as:

$$D_{AG}=I_{AB}+I_{BD}+I_{DF}+I_{FG}$$

Generally, a route from source node s to destination node j from a current node i, including source node s (i.e., A through F, excluding destination node G because G has no successor nodes) to a successor node k, including j (B through G, excluding source node A because A cannot be a successor node), can be expressed as:

$$D_{ij}=D_{kj}+I_{ik}$$

and the cost from source node s to destination node j, through intermediate nodes x1, x2, xi can be expressed as:

$$D_{sj}=I_{sx1}+I_{x1x2}+\ldots I_{x2xi}\ldots +I_{xij}$$

Processing Node Costs

If the cost of processing a data flow at a processing node (server) is not taken into account in a given network, then the communication cost, $D_{sj}$, of routing a flow of data form a source node s to a destination node j is simply equal to the sum of all the link costs, as shown above. In addition to delays at the links, however, delays may also be encountered at processing nodes (servers). Therefore, an equation for determining the cost, $D_{sj}$, of routing a flow of data from a source node s to a destination node j should additionally factor in a node delay, or a processing node cost. A node delay that is at current node i, $\gamma_{ik}$, is measured by the ratio of the input data rate to current node i to the output data rate to successor node k. In the example of FIG. 1, the cost of routing a flow of data from source node A to destination node G in route ABDFG, wherein node B, node D, and node F are intermediate nodes, can then be expressed as follows:

$$D_{AG}=D_{BG}\cdot(\gamma_{AB})+I_{AB}$$

$$D_{BG}=D_{DG}\cdot(\gamma_{BD})+I_{BD}$$

$$D_{DG}=D_{FG}\cdot(\gamma_{DF})+I_{DF}$$

$$D_{FG}=D_{GG}\cdot(\gamma_{FG})+I_{FG}$$

Again, since there is no link cost associated with a destination node, the cost of routing data at node G, $D_{GG}=0$. Working backwards, and substituting for equations:

$$D_{FG}=D_{GG}\cdot(\gamma_{FG})+I_{FG}, \text{ where } D_{GG}=0;=0\cdot(\gamma_{FG})+I_{FG}$$

$$=0+I_{FG};$$

$$=I_{FG};$$

$$D_{DG}=D_{FG}\cdot(\gamma_{DF})+I_{DF};$$

$$=(I_{FG}\cdot(\gamma_{DF}))+I_{DF};$$

$$D_{BG}=D_{DG}\cdot(\gamma_{BD})+I_{BD};$$

$$=((I_{FG}\cdot(\gamma_{FG})+I_{DF})\cdot(\gamma_{BD}))+I_{BD};$$

$$D_{AG}=D_{BG}+I_{AB};$$

$$=((((I_{FG}\cdot(\gamma_{DF})+I_{DF})\cdot(\gamma_{BD}))+I_{BD})\cdot(\gamma_{AB}))+I_{AB}$$

As shown by these equations, each link cost is multiplied by a scaling factor, $\gamma_{ik}$ that measures the node delay of data entering a current node i that is output to a successor node k. The above equation is generally stated as follows:

$$D_{ij}=(D_{kj}\cdot Y_{ik})+I_{ik}$$

$\gamma_{ik}$ for a current node i is defined such that the input to output data rate ratio for a node that does not process data (i.e., a router) is 1:1, so that $\gamma_{ik}=1$, and:

$$D_{ij}=D_{kj}\cdot(\gamma_{ik})+I_{ik}=D_{kj}+I_{ik} \quad \text{Equation 1}$$

Likewise, for a node i that is a processing node:

$$D_{ik}=D_{kj}\cdot(\gamma_{ik})+I_{ik} \quad \text{Equation 2}$$

Determining Link Costs

Figure 2:
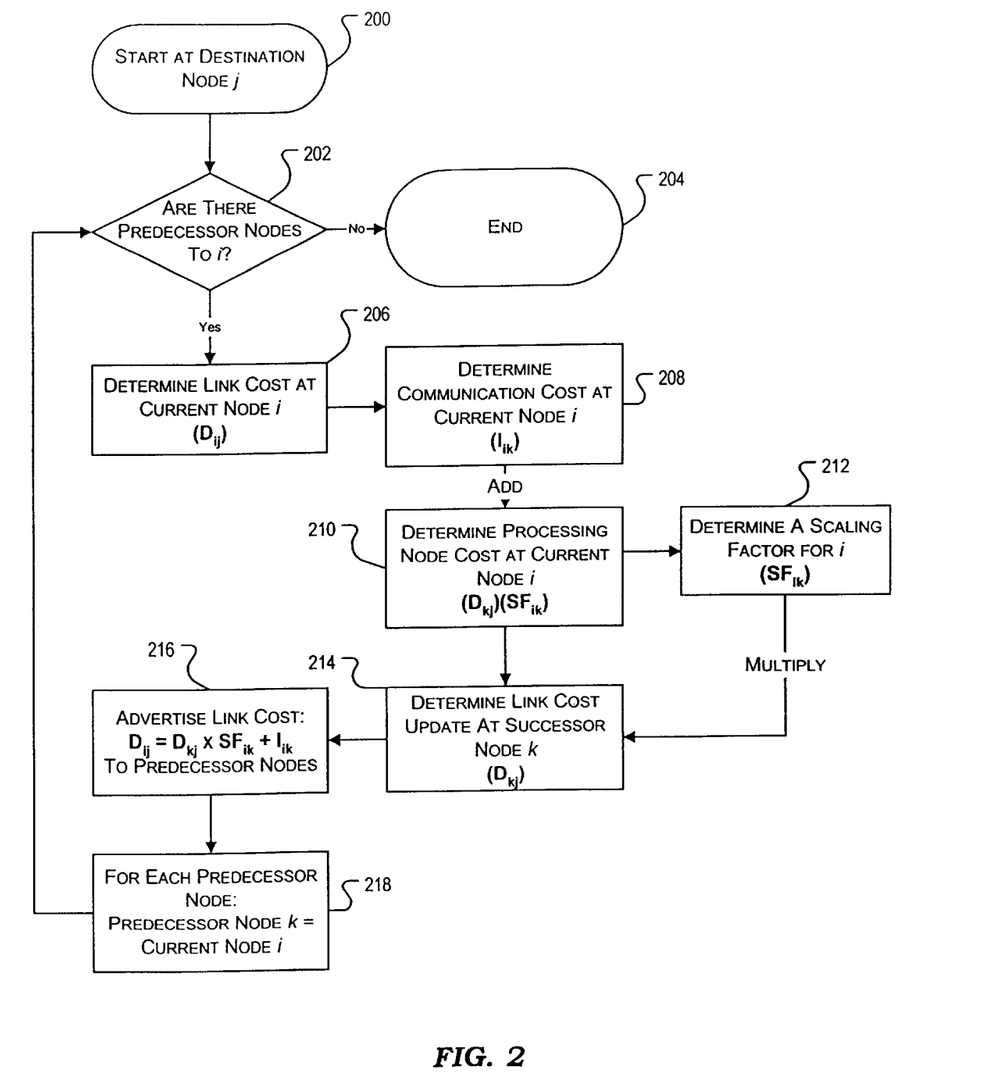
FIG. 2 is a flowchart for determining link costs in a network.

Since the cost of routing data from a destination node j to a destination node j is a fixed cost, i.e., 0, a link cost is determined at each node by propagating backwards from the destination node j to the source node s. As illustrated in FIG. 2, (where SF is the scaling factor, $\gamma$), starting from the destination node 200, it is determined if there are predecessor nodes to a given current node i 202. If there is no predecessor node, then a source node s has been reached, and the process ends 204. If there is a predecessor node, then a link cost is determined for each current node 206 by determining a communication cost 208 and adding it to a processing node cost 210 at current node i for routing data from current node i to each of the current node's successor nodes k. (Since there are no successor nodes at destination node j, the link cost at the destination node j is 0.) Successor nodes k refer to nodes that are closer to the destination node j than a current node i when data is being routed; and predecessor nodes are nodes that can potentially route data to the current node i when data is eventually routed in accordance with the link costs.

The processing node cost at current node i is calculated by determining a scaling factor at i 212 and multiplying it by the link cost update at successor node k 214. Since the scaling factor for a node which does not process data is 1 (see above), in one embodiment, a scaling factor can be determined for all nodes. In other embodiments, a scaling factor can be conditionally determined upon finding that the current node i is a node that processes data. Both embodiments result in the same calculation.

If the current node i has predecessor node(s), the link cost for current node i is advertised to the predecessor node(s) 216. Each predecessor node then becomes the current node to determine the predecessor node's link cost 218, and the process is repeated at block 202. If there are no predecessor nodes to the current node, then the process ends 204.

Figure 3:
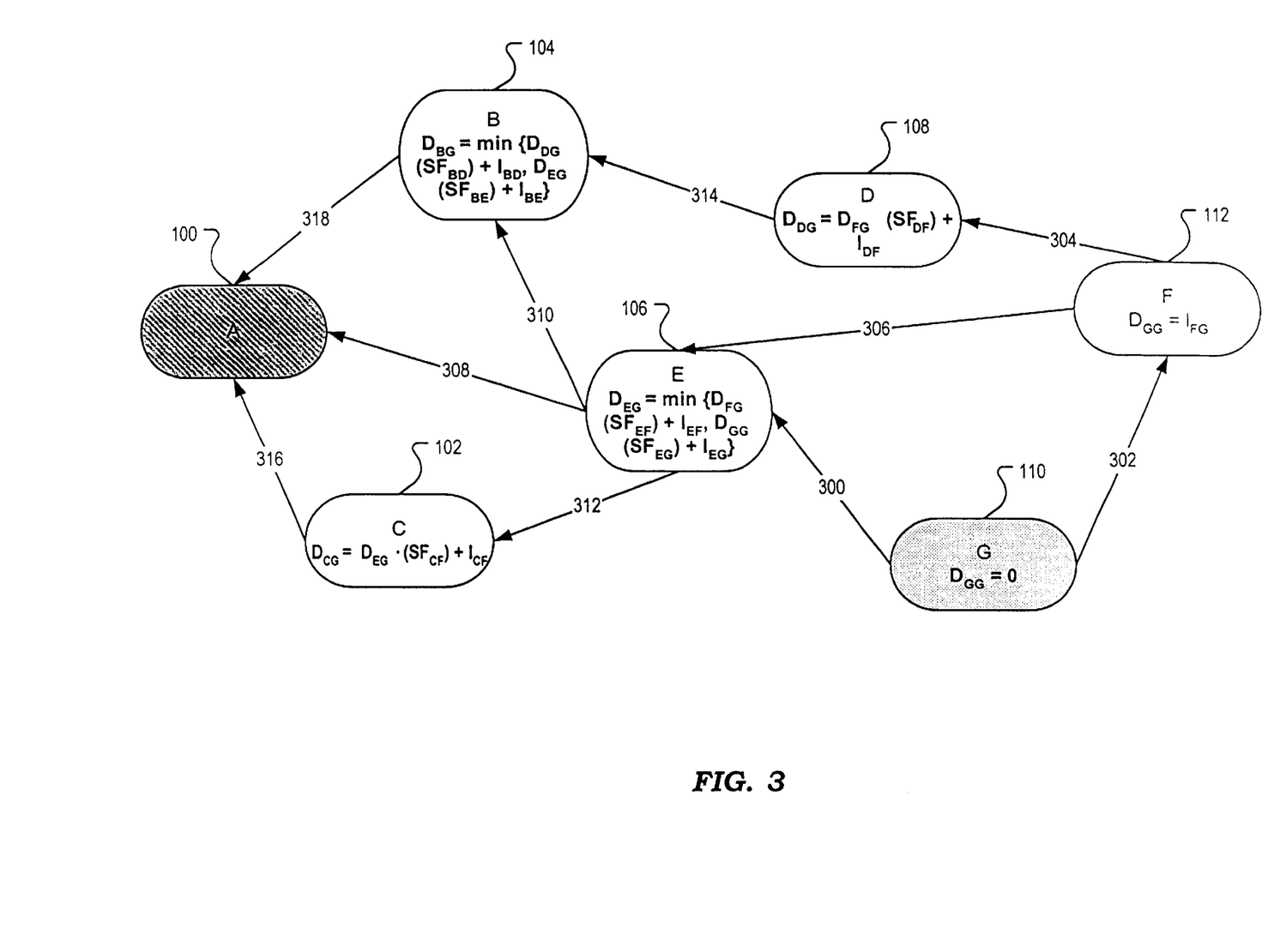
FIG. 3 illustrates determining link costs in the illustrative network of FIG. 1.

In reference to FIG. 1, a link cost at each node in the network is determined using Equation 2 as illustrated in FIG. 3, and as follows, where SF is the scaling factor, $\gamma$:

Node G

The link cost for node G is 0. Node G, therefore, advertises a cost 300, 302 of 0 to its neighbors, E and F, respectively:

$$D_{CG}=0$$

Node F

At node F, there is only one link, so node F advertises a cost 304, 306 of $$D_{FG}=D_{GG}\cdot(\gamma_{FG})+I_{FG}$$

$$=0\cdot(\gamma_{FG})+I_{FG}$$

$$=I_{FG}$$

to its neighbors D and E, respectively.

Node E

There are two links from node E: link E to F, and link E to G. Where there are more than two successors nodes to a given current node, the current node selects the successor node having the minimum cost of routing data to the node. Thus, node E advertises a cost 308, 310, 312 of:

$$D_{EG}=\min\{D_{FG}\cdot(\gamma_{EF})+I_{EF}, D_{GG}\cdot(\gamma_{EG})+I_{EG}\}$$

where the cost of the elements in brackets is dynamically calculated, based on the best cost advertised to E. The dynamically calculated cost is then advertised by node E to its neighbors A, B, and C.

Node D

At node D, there is only one link so that the cost advertised by node D to its neighbor B 314 is:

$$D_{DG}=D_{FG}\cdot(\gamma_{DF})+I_{DF}$$

Node C

At node C, there is only one link so the cost advertised by node C to its neighbor A 316 is:

$$D_{CG}=D_{EG}\cdot(\gamma_{CF})+I_{CF}$$

Node B

Node B has two links, so it advertises a cost 318 of:

$$D_{BG} = \min\{D_{DG} \cdot (\gamma_{BD}) + I_{BD}, D_{EG} \cdot (\gamma_{BE}) + I_{BE}\} \text{ to its neighbor A.}$$

Node A

Since node A is a source node, it does not advertise a cost.

Routing Data

Figure 4:
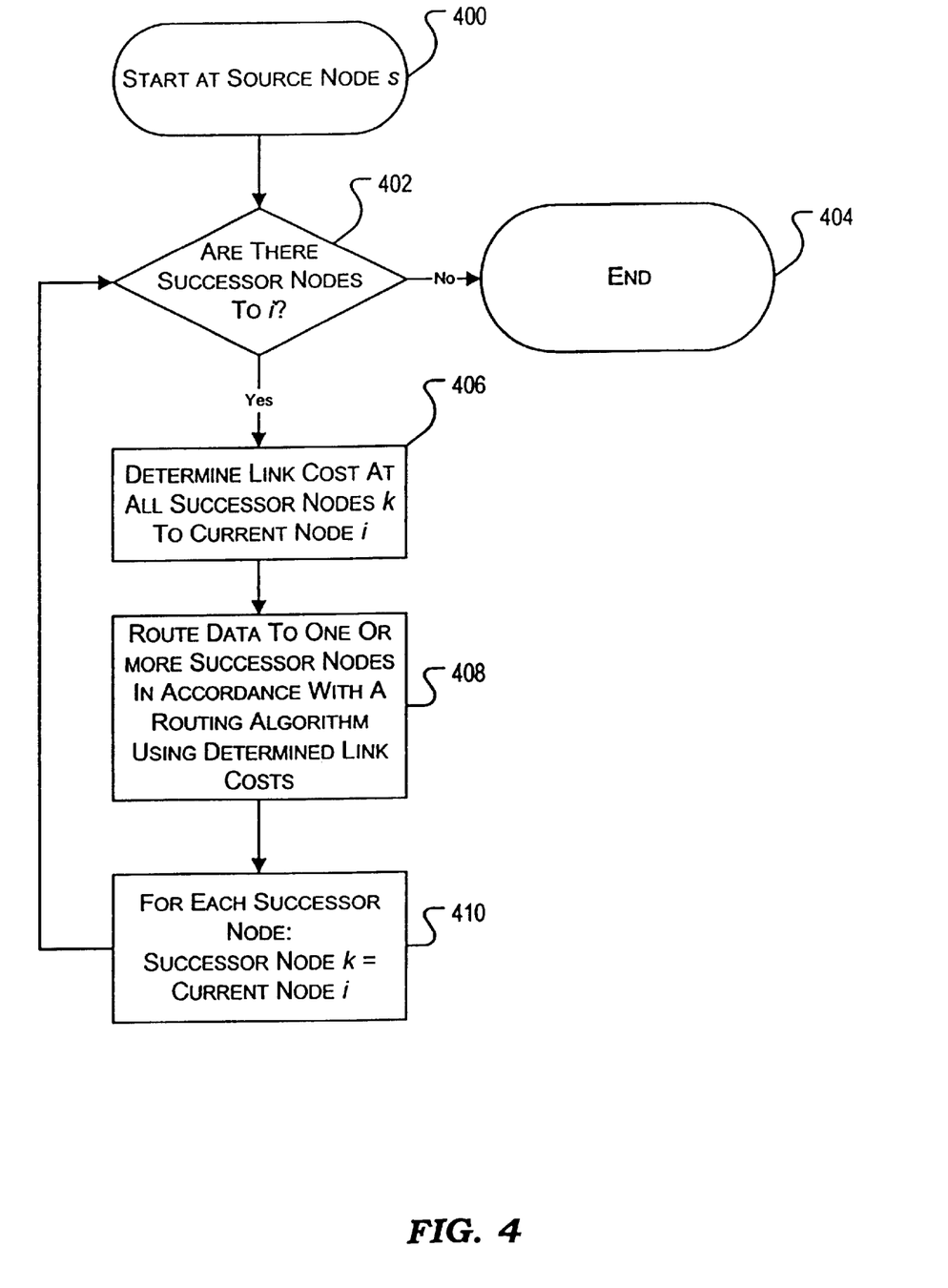
FIG. 4 is an illustrative flowchart for routing data using link costs calculated in accordance with this invention.

Link costs which factor in a scaling factor to account for additional traffic generated by a current node can be used to route data to network nodes for a requested service. As illustrated in FIG. 4, data is routed starting at source node s 400. For a current node i, it is determined if there are any successor nodes k to i. If there are no successor nodes k, then the destination node has been reached, and the process ends 404. If there is at least one successor node k, then a link cost is determined for all successor nodes k to current node i 406. Data is then routed to one or more of the successor nodes k in accordance with a routing algorithm that uses the determined link cost 408. The process is repeated for each successor node 410 at block 402.

In one embodiment, data is routed to a successor node having the lowest link cost. In reference to FIG. 1, beginning at node A, data is routed to a node in its successor set, node B and node C, advertising the lowest link cost, $D_{BG}$ or $D_{CG}$. Assuming node B advertises the lowest link cost, data is then routed to node D or node E, whichever advertises the lowest link cost, and so forth, until the destination node, node G, is reached.

In a preferred embodiment, link costs are used to calculate routing parameters for nodes in a route for a given service. Routing parameters determine a fraction of data that is forwarded to a corresponding node. In this embodiment, data can be routed to more than one node for a given step. For example, data at node A can be forwarded to node B and node C in fractions determined by routing parameters.

Initial Load Assignment

An algorithm for determining a minimum delay route with load-balanced anycasting in a preferred embodiment can be stated as follows: for a given network topology, a given set of servers, and traffic scaling factors, a set of routing variables ($\Phi$) is determined for each node (servers and routers) that may be traversed for a requested service, such that the total delay ($D_T$) for the network is minimized.

For any given data flow, the flow is routed from a current node to a successor node such that the delay of the network is minimized. To achieve this minimum delay, multiple paths for a given service are first computed. In the example of FIG. 1, each node maintains information about how to reach a service through a successor. For example, node A knows that an encryption service can be provided by routing data to node B or node C, and node E knows that an encryption service can be provided by routing data to node F or node G.

When the successor set to a current node is computed for the first time, or re-computed again due to long-term route changes, the following algorithm can be used to distribute traffic over the successor set:

For a current node i, determine i's successor nodes k and set the routing parameters $\phi_{ik}$ (fraction of traffic to route to a given node) for all other nodes to 0. If there is only one node in the successor set, then set $\phi_{ik}$ to 1 (all traffic is forwarded from i to k). If there is more than one node in the successor set, where k is a particular successor node in the successor set, and m is all successor nodes in the successor set including k, then:

$$\phi_{ik} = (1 - ((D_{jk} + I_{ik})/(\Sigma_m D_{im} + I_{im})))/(<\text{\# nodes in successor set}>-1)$$

in a preferred embodiment. This calculation determines new routing paths by changing successor sets, and is made every $T_l$ seconds.

Incremental Load Assignment

Every $T_s$ seconds, where $T_s < T_l$, the routing parameters are adjusted to incrementally move traffic from nodes with large link costs to nodes with the least link costs. The amount of traffic moved away from a node is proportional to how large the cost of the node is compared to the best successor node. This can be accomplished using an algorithm similar to the following:

For a given current node, find the successor node, $k_0$ having the lowest link cost. Calculate a ratio, $a_{ik}$, by which traffic at the other successor nodes is incrementally reduced, and adjust the routing parameters accordingly. Re-route traffic according to the new routing parameters.

Conclusion

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

For example, while the invention has been described using delay as a cost metric, it should be understood by one skilled in the art that delay is only an exemplary cost metric, but is not the only cost metric that can be used. Furthermore, it should be understood that the invention described herein can be implemented in any algorithm for routing data. In this respect, any routing algorithm within the spirit of the invention implements the method for determining link costs described herein.

What we claim is:

1. A method for determining the cost of routing data comprising determining a link cost at a current node, said determining a link cost comprising:

determining a communication cost comprising the cost of routing data from a current node to a successor node over a communication channel; and determining a processing node cost comprising determining a link cost at a successor node adjusted by a ratio of data input rates to data output rates at the current node, the determining the link cost at a successor node comprising determining a communication cost at the successor node and determining the processing node cost at the successor node.

2. A method as in claim 1, wherein the cost metric for measuring the communication cost and for measuring the processing node cost comprises a marginal delay.

3. A method for load-balanced data routing, the method comprising:

determining a link cost for routing data through at least one current node in a network, the link cost including:
      a communication cost for a given current node; and
      a processing node cost for the given current node, the processing node cost including a link cost update from a successor node adjusted by a scaling factor to account for traffic generated by the given current node; and routing data from a given current node to at least one successor node until a destination node is reached, said routing being in accordance with the determined link costs for the at least one current node in the network.

4. A method as in claim 3, wherein the metric used to measure cost comprises a marginal delay.

5. A method as in claim 3, wherein the routing comprises:

determining a best successor node to a given current node, the best successor node having the lowest link cost; and routing data to the best successor node.

6. A method as in claim 3, wherein the routing comprises:

for a given current node, using the link cost associated with the given current node to calculate routing parameters for the given current node;

routing data to the given current node in accordance with the calculated routing parameters.

7. A method for minimizing delay in routing data, comprising:

for each current node, beginning from a destination node, determining a successor set having a number of successor nodes to a given current node;

determining a link cost associated with routing data from the given current node to each successor node in the successor set, the determining comprising factoring in a scaling factor to account for additional traffic generated by the given current node, the scaling factor comprising a ratio of data input rates to data output rates at the given current node and at each current node, beginning from a source node, routing data to one or more successor nodes in a successor set corresponding to the current node, the routing being in accordance with the determined link costs.

8. A method as in claim 7, said routing data to one or more successor nodes in accordance with the determined link costs comprising:

calculating a set of routing variables for each current node, the routing variables determining a fraction of the data to be routed to a given current node; and routing data to one or more successor nodes in the successor set in accordance with the routing variables.

9. A method as in claim 7, said routing data to one or more successor nodes in accordance with the determined link costs comprising:

determining a best successor node to a given current node, the best successor node having the lowest link cost; and routing data to the best successor node.

10. A method as in claim 7, wherein the cost metric for link cost comprises a marginal delay.

11. A method for minimizing delay in routing data, comprising:

for each current node, beginning from a destination node, determining a successor set having a number of successor nodes to the given current node;

for each successor node in the successor set, calculating a link cost of routing data from the given current node to a given one of the successor nodes, the calculating comprising:

calculating a processing node cost by adjusting a link cost update from a given successor node by a scaling factor corresponding to the given current node, the scaling factor accounting for additional traffic generated by the given current node; and combining the processing node cost with a communication cost, the communication cost corresponding to a cost of routing data on a communication channel between the given current node and the given successor node; and for each current node between the source node and the destination node in the network, including the source node, routing the data from the current node to a successor node in accordance with the calculated link costs.

12. A method as in claim 11, said routing data to one or more successor nodes in accordance with the determined link costs comprising:

calculating a set of routing variables for each current node, the routing variables determining a fraction of the data to be routed to a given current node; and routing data to one or more successor nodes in the successor set in accordance with the routing variables.

13. A method as in claim 11, said routing data to one or more successor nodes in accordance with the determined link costs comprising:

determining a best successor node to a given current node, the best successor node having the lowest link cost; and routing data to the best successor node.

14. A method as in claim 11, wherein the cost metric for measuring the communication cost and for measuring the processing node cost comprises a marginal delay.

* * * * *